(12) United States Patent
Kelly et al.

(10) Patent No.: US 6,747,774 B2
(45) Date of Patent: Jun. 8, 2004

(54) APPARATUS AND METHOD FOR CONTROLLING OPTICAL GAIN PROFILES

(75) Inventors: Jack R. Kelly, Stow, OH (US); Haiji J. Yuan, Cupertino, CA (US); Qingyu (Tom) Li, Cupertino, CA (US); Hudson Washburn, Santa Clara, CA (US)

(73) Assignee: CoAdna Photonics, Inc., San Jose, CA (US)

( * ) Notice: Subject to any disclaimer, the term of this patent is extended or adjusted under 35 U.S.C. 154(b) by 161 days.

(21) Appl. No.: 10/007,326

(22) Filed: Dec. 5, 2001

(65) Prior Publication Data

US 2003/0016445 A1 Jan. 23, 2003

Related U.S. Application Data

(60) Provisional application No. 60/306,663, filed on Jul. 19, 2001.

(51) Int. Cl.$^7$ ............... G02F 1/01; G02F 1/03; G02B 6/00
(52) U.S. Cl. ............... 359/238; 359/245; 359/280; 385/11
(58) Field of Search ............... 385/11; 359/249, 359/483, 494, 250, 254, 238, 245, 280, 283, 284; 349/194

(56) References Cited

U.S. PATENT DOCUMENTS

| | | | |
|---|---|---|---|
| 5,239,607 A | 8/1993 | da Silva et al. | 385/122 |
| 5,900,968 A | 5/1999 | Srivastava et al. | 359/341 |
| 5,923,462 A | 7/1999 | van der Plaats | 359/341 |
| 6,141,069 A | 10/2000 | Sharp et al. | |
| 6,141,130 A | 10/2000 | Ip | 359/179 |
| 6,144,474 A | 11/2000 | Nitta et al. | 359/179 |
| 6,144,488 A | 11/2000 | Okuno | 359/341 |
| 6,212,315 B1 | 4/2001 | Doerr | 385/31 |
| 6,219,176 B1 | 4/2001 | Terahara | 354/341 |
| 6,307,667 B1 * | 10/2001 | Liang | 359/337 |
| 6,429,962 B1 | 8/2002 | Xu et al. | |

OTHER PUBLICATIONS

Ho Sung Cho, et al., "Dynamic Gain Equalized Hybrid Optical Amplifier Composed of Erbium Doped Fiber Amplifier and Semiconductor Optical Amplifier," *Jpn.J.Appl. Phys.*, vol. 38, pp. 1.187(1999).

Jeremy A. Bolger, et al., "Group Delay of a Micro–Optic Dynamic Gain–Flattening Filter," *Technical Digest*–Postconference Edition of OFC 2001. ISBN# 155752–654–0, TOPS vol. 54, Paper MK4–1–MK4–3 (2001).

Taichi Kogure, et al., "Polarization Insensitive Adaptive Gain Profile Equalizer using Variable Faraday Rotators and Walk–Off Crystals," *Technical Digest*–Postconference Edition of OFC 2001, ISBN# 155752–654–0, TOPS vol. 54, Paper MK3–1–MK3–1 (2001).

* cited by examiner

*Primary Examiner*—Timothy J Thompson
(74) *Attorney, Agent, or Firm*—Cooley Godward LLP

(57) ABSTRACT

The invention includes an apparatus for processing an input optical beam. The apparatus has at least one variable optical element to dynamically alter the polarization state of an optical beam to form a polarization-altered optical beam, wherein the polarization-altered optical beam includes elliptical polarization. At least one wave plate operates on the polarization-altered optical beam, each wave plate has a selected retardation, order of retardation, and orientation. A polarization analyzer, operating in conjunction with the at least one variable optical element and wave plate, alters the transmitted amplitude of the polarization-altered optical beam as a function of wavelength, and thereby produces an output optical beam with transmitted amplitude adjusted as a function of wavelength.

40 Claims, 13 Drawing Sheets

APPARATUS AND METHOD FOR CONTROLLING OPTICAL GAIN PROFILES

This application claims priority to U.S. provisional patent application No. 60/306,663, filed Jul. 19, 2001, entitled "A Dynamic Gain Tilt Control Device now abandoned."

BRIEF DESCRIPTION OF THE INVENTION

The present invention relates generally to optics, fiber optics, and optical networks. More particularly, the present invention relates to the control of optical gain profiles through the use of a dynamic gain tilt and curvature control device that has applications in optical networks, optical communications, and optical instrumentation.

BACKGROUND OF THE INVENTION

Optical fibers are replacing copper cables at a rapid pace as the transition medium for communication systems. Optical fibers are used in the long-haul telecommunication backbone, as well as in regional and metropolitan systems to service the fast growing need of wider bandwidth and faster speed fueled by Internet usage. A dramatic increase in the information capacity of an optical fiber can be achieved by the simultaneous transmission of optical signals over the same fiber from many different light sources having properly spaced peak emission wavelengths. By operating each source at a different peak wavelength, the integrity of the independent messages from each source is maintained for subsequent conversion to electric signals at the receiving end. This is the basis of wavelength division multiplexing (WDM). To ensure smooth and efficient flow of information, optical networks should have intelligence built in. Dynamically controllable devices are one of the key building blocks for smart optical networks.

For optical signals to travel long spans in optical networks based on WDM or dense WDM (DWDM) without expensive optical-to-electrical-to-optical (OEO) conversion, optical amplifiers are used. Today, the most often used optical amplifiers are Erbium Doped Fiber Amplifiers (EDFAs). Optical networks need to have uniform power levels across the channels to minimize detection noise and signal saturation problems. However, in practice, the widely used EDFAs have non-linear gain profiles. For static EDFA gain, the gain profile can be compensated by passive gain flattening filters (GFF) based on thin film dielectric filtering or Bragg grating technologies. However, in addition to this static problem, there are several factors that cause dynamic wavelength dependent gains in the optical networks. These factors include (a) saturation effect of the amplifier medium; (b) pump laser power and different gain settings; and (c) number of channels (changes due to adding and dropping channels) input powers.

FIG. 1a shows the measured gain profiles of an EDFA (with a GFF) set at different gains. It is evident that the gain profile tilts significantly (>10 dB) over the 1528 nm to 1563 nm wavelength band. In addition, there is a noticeable change in slope below approximately 1540 nm when the gain setting is changed from 20 to 10 dB. The GFF in this case has been optimized for 23 dB amplification. As a rule, if the gain is set below the GFF-optimized gain, the tilt is positive; if the gain is set above the GFF-optimized gain, the tilt is negative. This is illustrated in FIG. 1b, which shows the tilt for an EDFA that has been gain-flattened with a GFF at 20 dB.

To compensate dynamically for this wavelength dependent gain, dynamic gain equalizing (DGE) devices have to be used. Several DGE solutions have been proposed. They fall into two general categories: dynamic channel equalizer (DCE) and dynamic spectral equalizer (DSE). Dynamic channel equalizers use a grating or thin film filters to de-multiplex (demux), control, and then multiplex (mux) individual channels to achieve equalization. Although they offer good flexibility down to individual channel levels, they are sensitive to channel number and spacing, and thus not scalable. They are also complicated in design, large in package size, and very expensive (>$1000/channel).

Dynamic spectral equalizers, on the other hand, only control the overall spectral shape without the demux/mux steps and offer important scalability. They can be used for different DWDM systems with different channel numbers and spacing. The current solutions are based on multiple stage systems, where each stage controls a portion of the spectrum. Their disadvantages include high cost, high insertion loss, and reliability. They are still complicated in design, packaging (e.g. alignment of many stages), and control. Therefore, they are still expensive (>$5000).

A known optical control technique is tunable optical retardation. Tunable optical retardation can be implemented in a number of ways. For example, a liquid crystal can be used to implement this function. Liquid crystals are fluids that derive their anisotropic physical properties from the long-range orientational order of their constituent molecules. Liquid crystals exhibit birefringence and the optic axis can be reoriented by an electric field. This switchable birefringence is the mechanism underlying nearly all applications of liquid crystals to optical devices.

A liquid crystal variable wave plate is illustrated in FIG. 2a. A layer of nematic liquid crystal 1 is sandwiched between two transparent substrates 2 and 3. Transparent conducting electrodes 4 and 5 are coated on the inside surfaces of the substrates. The electrodes are connected to a voltage source 6 through an electrical switch 7. Directly adjacent to the liquid crystal surfaces are two alignment layers 8 and 9 (e.g., rubbed polyimide) that provide the surface anchoring required to orient the liquid crystal. The alignment is such that the optic axis of the liquid crystal is substantially the same through the liquid crystal and lies in the plane of the liquid crystal layer when the switch 7 is open.

FIG. 2b depicts schematically the liquid crystal configuration in this case. The optic axis in the liquid crystal 1 is substantially the same everywhere throughout the liquid crystal layer. FIG. 2c shows the variation in optic axis orientation 12 that occurs because of molecular reorientation when the switch 7 is closed.

As an example, we consider a switchable half wave retardation plate. For this case, the liquid crystal layer thickness, d, and birefringence, $\Delta n$, are chosen so that $$\frac{\Delta n d}{\lambda} = \frac{1}{2} \tag{1}$$

where $\lambda$ is the wavelength of the incident light. In this situation, if linearly polarized light with wave vector 13 is incident normal to the liquid crystal layer with its polarization 14 making an angle 15 of 45 degrees with the plane of the optic axis of the liquid crystal, the linearly polarized light will exit the liquid crystal with its polarization direction 18 rotated by 90 degrees from the incident polarization.

Referring now to FIG. 2c, the optic axis in the liquid crystal is reoriented by a sufficiently high field. If the local optic axis in the liquid crystal makes an angle θ with the wave vector k of the light, the effective birefringence at that point is $$\Delta n_{\textit{eff}} = \frac{n_e n_o}{\sqrt{n_o^2 \cos^2\Theta + n_e^2 \sin^2\Theta}} - n_o \quad (2)$$

where $n_o$ and $n_e$ are the ordinary and extraordinary indices of the liquid crystal, respectively. The optic axis in the central region of the liquid crystal layer is nearly along the propagation direction 13. In this case, according to Eq. 2, both the extraordinary 16 and ordinary components 17 of the polarization see nearly the same index of refraction. Ideally, if everywhere in the liquid crystal layer the optic axis were parallel to the direction of propagation, the medium would appear isotropic and the polarization of the exiting light would be the same as the incident light.

Before leaving a discussion of this tunable half wave plate, it is useful for later understanding of the current invention to give a geometrical representation of the polarization as afforded by the Poincare sphere. FIG. 3 shows a projection of the Poincare sphere as viewed from the top. In this view, circular polarization 21 is at the center of the projection; all states of linear polarization occur on the equator—the outer most circle. Two diametrically opposed points on the sphere correspond to orthogonal polarizations. For example, the two points 22 and 23 represent orthogonal linear polarizations, as do points 24 and 25. When light propagates through a liquid crystal layer, or any other birefringent medium, its polarization will change continuously; this change can be mapped as a continuous curve on the sphere. The curve 26 shown on the sphere in FIG. 3 represents the changes in polarization that are experienced for the situation of FIG. 2b. Point 22 corresponds to the incident polarization and point 23 to the exit polarization of the unactivated liquid crystal cell. Observe that they are orthogonal.

In view of the foregoing, it would be highly desirable to provide a single-stage solution for dynamic (or tunable) gain tilt compensation. Ideally, such a solution would utilize tunable optical retardation, simplified control techniques, and could be implemented in a very compact package. In addition, such a solution would ideally provide a mechanism for closely fitting a non-linear spectral profile.

SUMMARY OF THE INVENTION

The invention includes an apparatus for processing an optical beam. The apparatus has at least one variable optical element to dynamically alter the polarization state of an optical beam to form a polarization-altered optical beam, wherein the polarization-altered optical beam includes elliptical polarization. At least one wave plate operates on the polarization-altered optical beam, each wave plate has a selected retardation, order of retardation, and orientation. A polarization analyzer, operating in conjunction with the at least one variable optical element and wave plate, alters the transmitted amplitude of the polarization-altered optical beam as a function of wavelength, and thereby produces an output optical beam with the transmitted amplitude adjusted as a function of wavelength.

The invention also includes a method of processing an optical beam. The method includes dynamically altering the polarization state of an optical beam to form a polarization-altered optical beam, wherein the polarization-altered optical beam includes elliptical polarization. The transmitted amplitude of the polarization-altered optical beam is altered as a function of wavelength, thereby producing an output optical beam with the transmitted amplitude adjusted as a function of wavelength.

BRIEF DESCRIPTION OF THE FIGURES

The invention is more fully appreciated in connection with the following detailed description taken in conjunction with the accompanying drawings, in which:

In FIG. 1a the amplifier is combined with a gain-flattening filter that is optimized for 23 dB of gain; FIG. 1b has a static gain-flattening filter optimized for 20 dB.

FIGS. 5a–5c show the performance of the embodiment of FIG. 4a. FIG. 5a illustrates how the variable wave plate retardation effects the changes in polarization from the minimum to maximum wavelength using the Poincare sphere representation. FIGS. 5b and 5c show the attenuation versus wavelength when the fixed wave plate is optimized for negative and positive slope, respectively.

FIGS. 7a–7c show the simulated performance of the embodiment of FIG. 6a. FIG. 7a shows the attenuation versus wavelength when the variable wave plate retardation is between 1.0 and 1.3 waves. FIG. 7b illustrates how the variable wave plate retardation effects the changes in polarization from the minimum to maximum wavelength using the Poincare sphere representation. FIG. 7c shows the attenuation versus wavelength when the variable wave plate retardation is between 0.7 and 1.0 waves.

FIG. 8 illustrates measured results for the embodiment of FIG. 6a.

Like reference numerals refer to corresponding parts throughout the several views of the drawings.

DETAILED DESCRIPTION OF THE INVENTION

The present invention provides a method and device for dynamically adjusting the wavelength profile of the intensity of an optical signal. The method incorporates an adjustable wave plate in combination with one or more high order fixed wave plates to tailor the polarization of the light versus wavelength. In combination with other optical elements such as polarizers and beam splitters, the polarization variation can be converted into an intensity variation with wavelength of the output optical beam. Such a device is particularly suited to controlling the output profile of a fiber amplifier (e.g. EDFA) to compensate for the wavelength dependence of the amplification for WDM applications. The adjustable wave plate can be of any type (e.g. birefringent crystal wedge, electro-optic, acousto-optic, or liquid crystal) and control may be mechanical, electromechanical or electronic depending on the type of wave plate that is used.

Figure 1A:
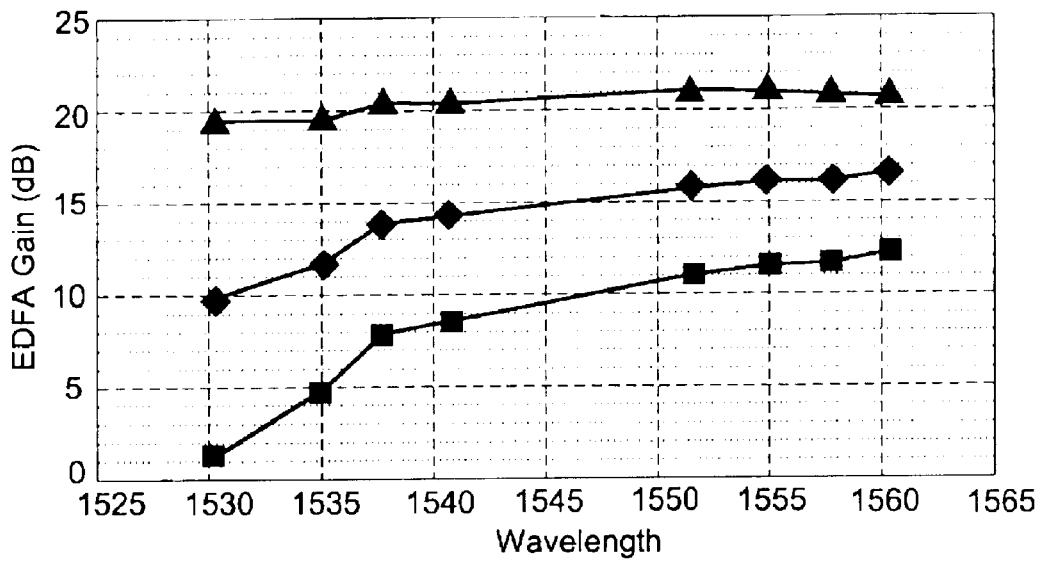
FIGS. 1a and 1b show the gain tilt of an Erbium-doped fiber amplifier (with gain flattening filter) for different amplifier gain settings.
Figure 1B:
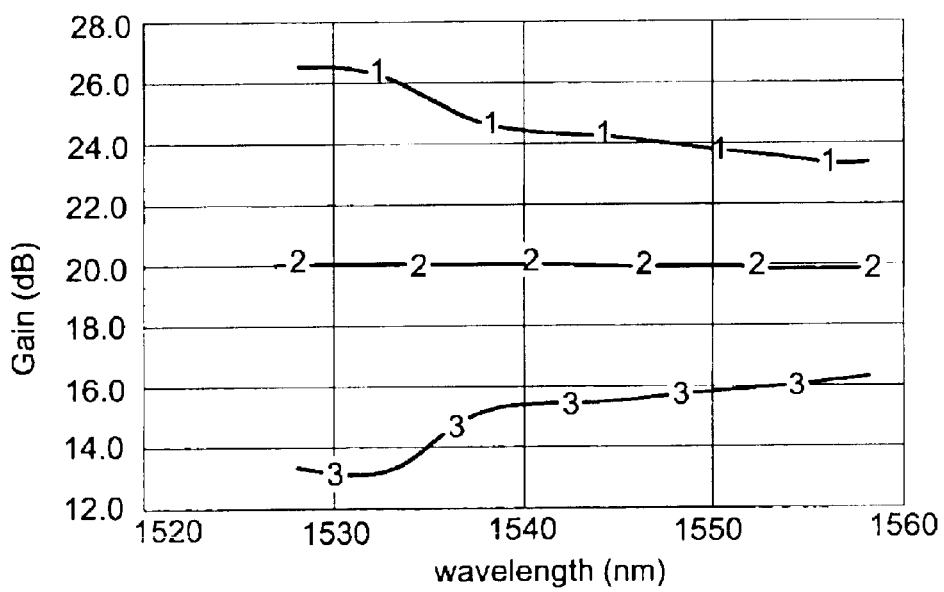
Figure 2A:
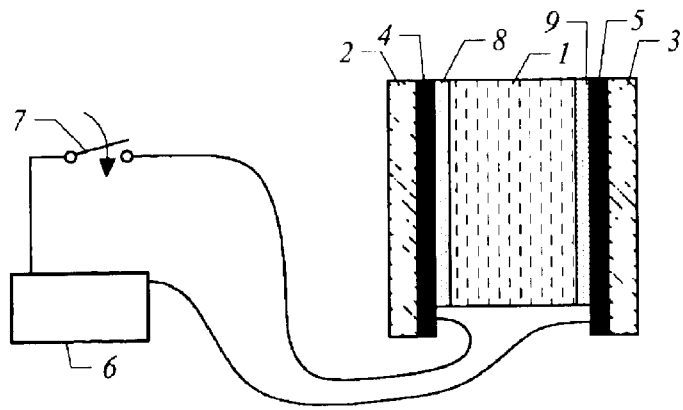
FIGS. 2a–2c illustrate the basic operation of a liquid-crystal-based electrically adjustable wave plate.
Figure 2B:
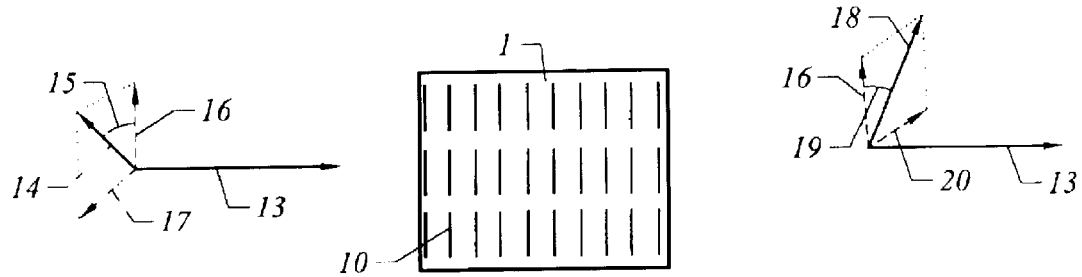
Figure 2C:
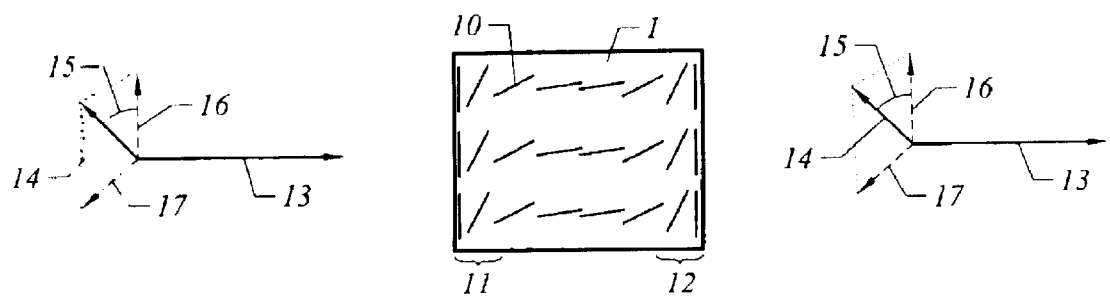
Figure 3:
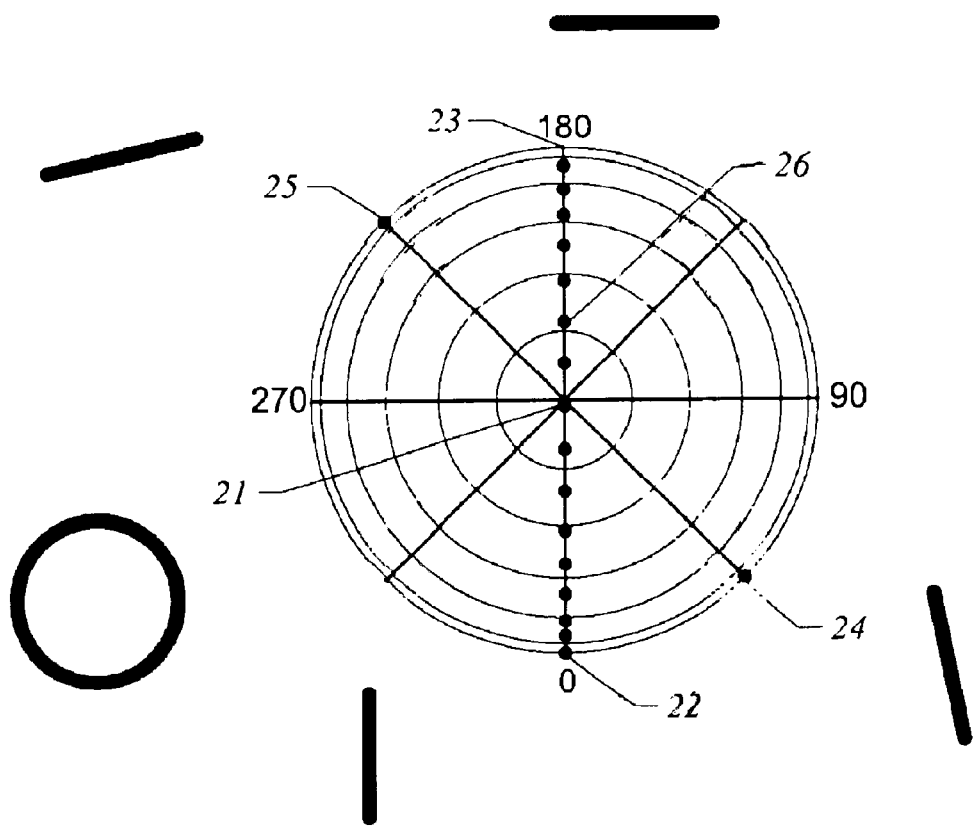
FIG. 3 shows a Poincare sphere representation of the polarization changes induced by a half wave plate.

The invention provides dynamic control of optical gain profiles. Certain embodiments are directed toward compensation for gain tilt and curvature as described in the background section. For illustrative purposes, the adjustable wave plate will be chosen as an electrically addressed liquid crystal cell, shown schematically in FIG. 2a. The basic concept of the invention is illustrated in FIG. 4a.

Figure 4A:
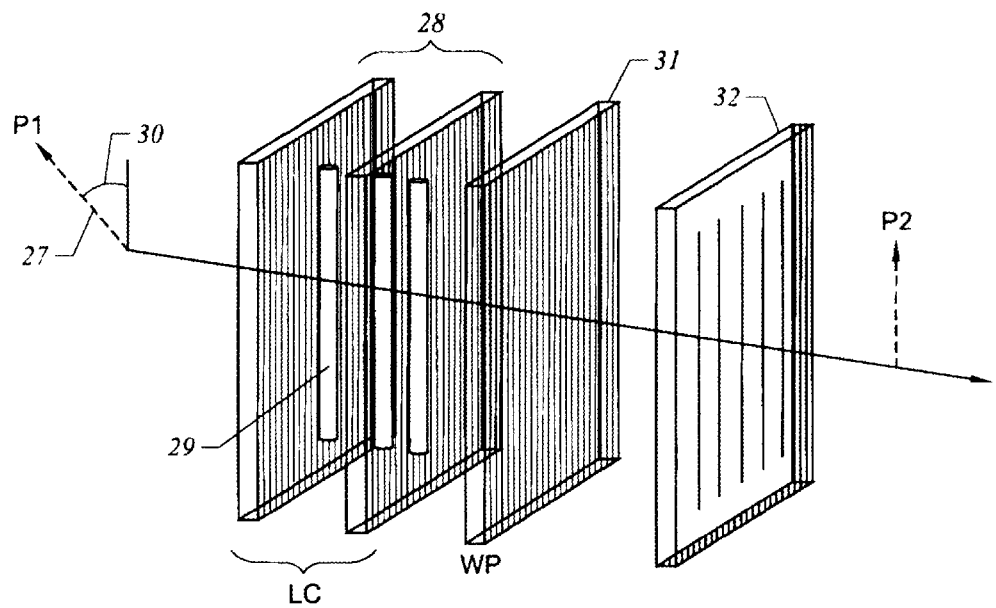
FIG. 4a illustrates a dynamic gain tilt compensation device incorporating one fixed wave plate.
Figure 4B:
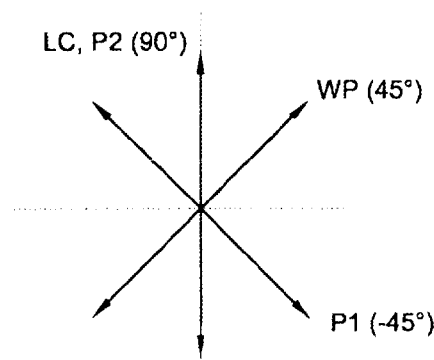
FIG. 4b illustrates a wave plate orientation of 45 degrees.

In FIG. 4a, a beam of linearly polarized light 27 is applied to a variable optical element in the form of a liquid crystal cell 28. The light passes normally through the homogeneously aligned liquid crystal cell 28 whose optic axis 29 makes an angle 30 of 45 degrees with the direction of polarization, as shown in FIG. 4b. After passing through the liquid crystal, the light passes normally through a static wave plate 31 whose optic axis is parallel to the optic axis of the liquid crystal. The wave plate 31 has a selected retardation, order of retardation, and orientation. After passing through the static wave plate 31, the light is in general elliptically polarized. As used herein, elliptical polarization can include circular polarization. The degree of ellipticity and the orientation of the major axis of the ellipse depend on the wavelength of the light. A polarization analyzer 32 is positioned after the wave plate 31. Operating in conjunction with the variable optical element 28 and the wave plate 31, the polarization analyzer 32 alters the transmitted amplitude of the polarization-altered optical beam as a function of wavelength. This produces an output optical beam with transmitted amplitude adjusted as a function of wavelength.

As will be more fully appreciated in connection with the following discussion, the apparatus of FIG. 4a alters the transmitted amplitude of the polarization-altered optical beam in a substantially linear manner on a logarithmic scale. Further, the transmitted amplitude of the polarization-altered optical beam can be altered in accordance with a selected profile. For example, the device of FIG. 4a can be configured to dynamically alter the polarization state of the input optical beam to smoothly and continuously alter the slope profile of the input optical beam. In particular, the slope profile can be altered between different states selected from a positive slope profile state, a substantially flat profile state, and a negative slope profile state.

Figure 5A:
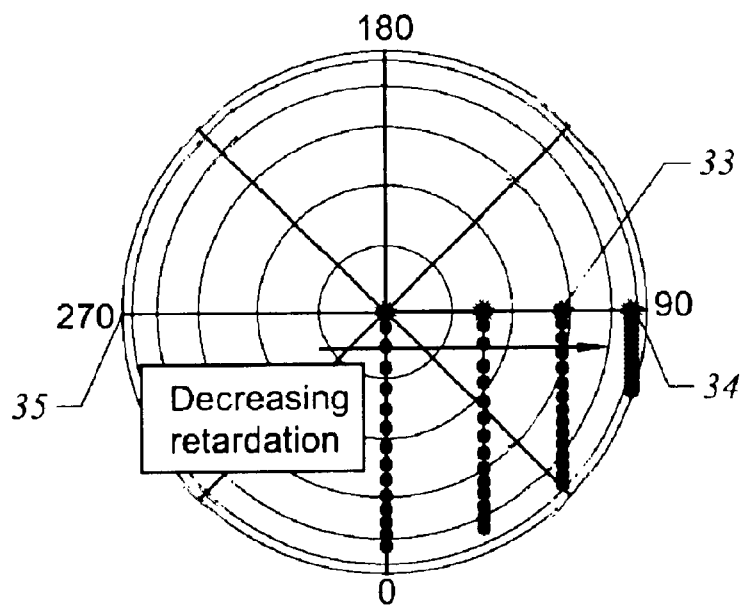

FIG. 5a shows a Poincare sphere plot of the polarization as a function of wavelength for light exiting the fixed wave plate. The wavelength ranges from 1530 nm, shown as the large point (33, for example), to 1565 nm. The four curves on the sphere correspond to different liquid crystal retardation values (i.e. different voltages applied to the cell). By design, the static wave plate retardation causes the 1530 nm point of all curves to lie on the meridian passing through the equatorial points 34 and 35. This is done by choosing the retardation of the static wave plate to be a whole number of waves at 1530 nm.

Figure 5B:
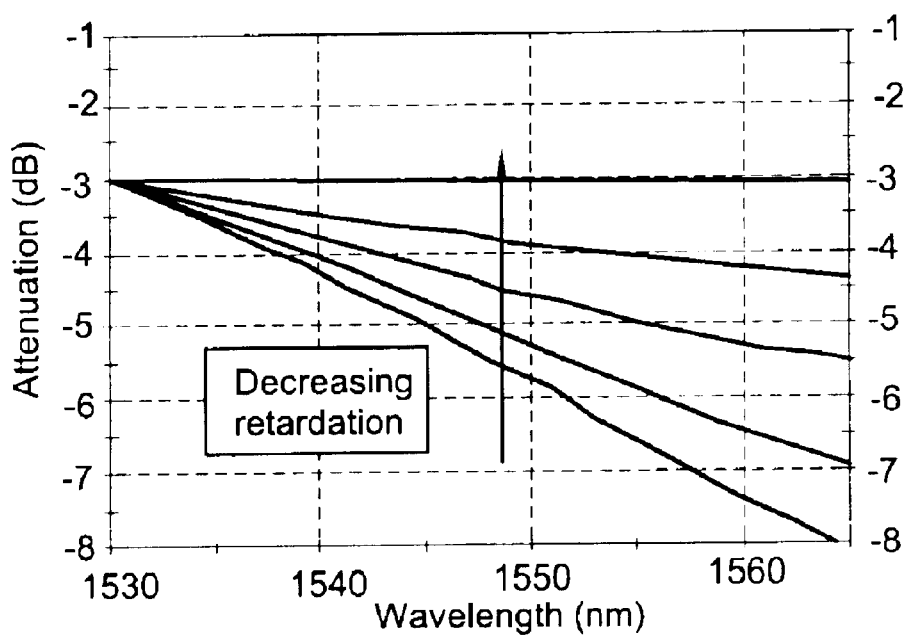

When a linear polarization analyzer (e.g., a polarizer) 32 is placed after the fixed wave plate 31 and oriented with its transmitting axis parallel to the liquid crystal alignment direction 29, the spectral transmission profile (in dB) develops a nearly linear variation with wavelength as shown in FIG. 5b. The slope is negative and decreases with decreasing liquid crystal retardation whenever $$m\lambda \leq \langle \Delta n_{eff} \rangle d \leq (m+\frac{1}{4})\lambda \tag{3}$$

where m is any integer and <...> denotes average over the thickness of the liquid crystal layer. For the curves in FIG. 5b, m=0. The static wave plate determines the maximum attainable slope at λ/4: the higher the order, the larger the slope, as indicated by a larger separation between wavelengths on the Poincare sphere. For the curves in FIG. 5b, the static wave plate is 8.5 waves thick for a wavelength of 1530 nm. With the analyzer oriented as shown in FIG. 4a, the static wave plate must be a half-integral number of waves at the prescribed wavelength (1530 nm in this case). However, if the analyzer transmitting direction is rotated by 90 degrees, then similar performance is attained when the static wave plate is an integral number of waves. This provides additional freedom for optimizing the optical performance.

It is also possible to achieve positive slopes, instead of negative, with a simple modification of the design of FIG. 4a. The retardation of the static wave plate 31 is chosen to be an integral number of waves at the maximum wavelength of the interval rather than the minimum wavelength. This is illustrated in FIG. 5c for a retardation of eight waves at 1565 nm.

The order of the elements in FIG. 4a is shown for descriptive purposes, however, it is understood that the order of the at least one wave plate and the at least one variable element in this or in subsequent embodiments described below can be altered with substantially the same result. When it is stated that the wave plate receives or operates on the polarization-altered optical beam it is understood that this includes the configuration whereby the polarized optical beam passes through a wave plate before it passes through a variable optical element.

For the embodiment just described, although the gain tilt is nearly linear over a wide dynamic range, there is a significant drawback: the minimum insertion loss is >=3 dB. This shortcoming is overcome with the embodiment shown in FIG. 6a. In this case, a second wave plate 36 (WP2) has been added to the design. The optic axis of WP2 makes an angle of nominally 10 degrees with the optic axis of wave plate 31 (WP1). Additionally, the transmitting axis of the polarizer 37 is rotated 90 degrees about its normal from its orientation in FIG. 4a. With this configuration, the insertion loss can be reduced to less than 1 dB over the same wavelength range as shown in FIG. 7a. The retardation values for the fixed wave plates WP1 and WP2 were set at 4.5 waves at 1530 nm and 8.5 waves at 1550 nm, respectively. Representative polarization-versus-wavelength curves are plotted on the Poincare sphere in FIG. 7b for different values of the liquid crystal retardation. To generate these curves, the liquid crystal retardation was varied between 1 and 1.2 waves (at 1550 nm). Unlike FIG. 5a, the curves are not parallel to the polarizer orientation (i.e. the 0–180 meridian line on the plot). If the liquid crystal retardation is decreased below 1.0 wave, polarization-versus-wavelength curves with positive slope are obtained.

Figure 5C:
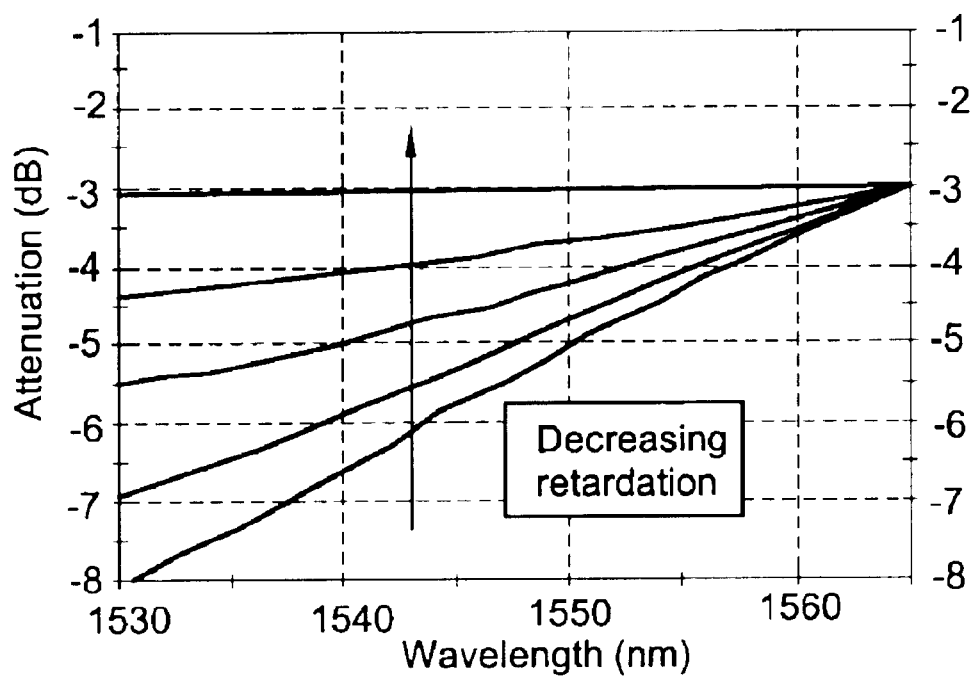

FIG. 5c shows curves obtained when the liquid crystal retardation varies between 0.7 and 1.0 waves. These curves, in addition to positive slope, have negative curvature. As was observed earlier, this corresponds to the behavior of the typical EDFA with a static GFF when the gain is increased, so some of the non-linearity in the gain tilt can be corrected when the gain tilt is negative.

Figure 6A:
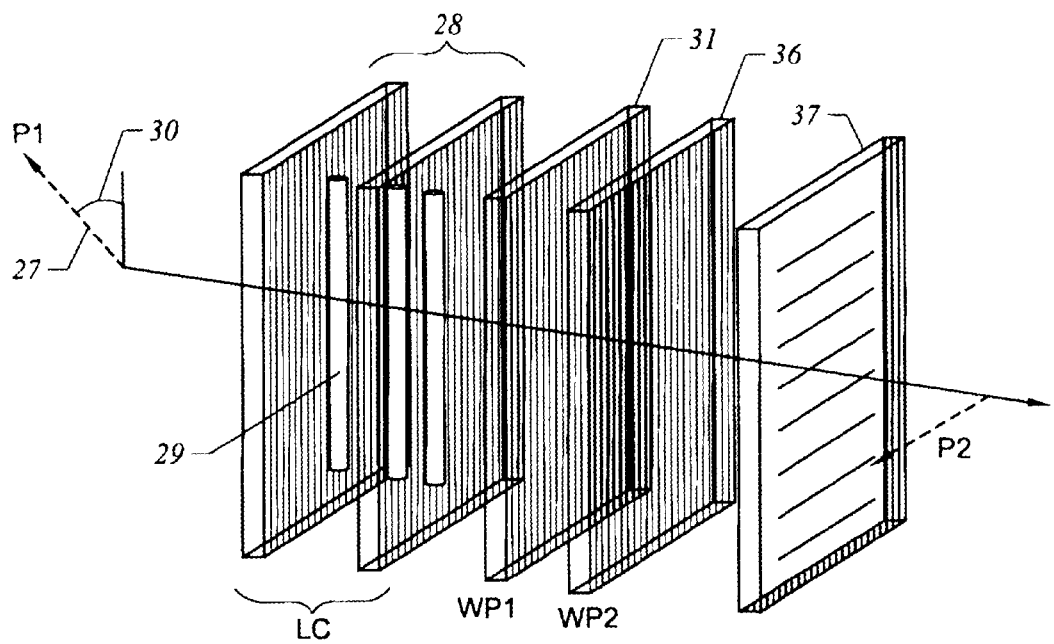
FIG. 6a illustrates a dynamic gain tilt compensation device employing two fixed wave plates.
Figure 6B:
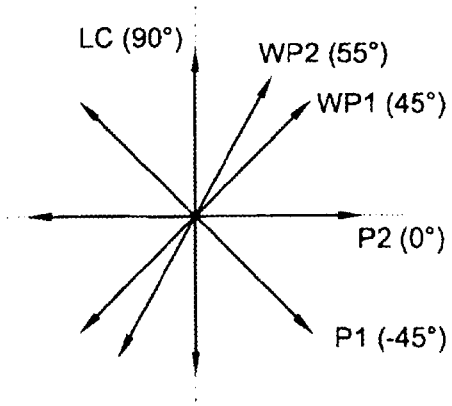
FIG. 6b illustrates wave plate orientations.
Figure 7A:
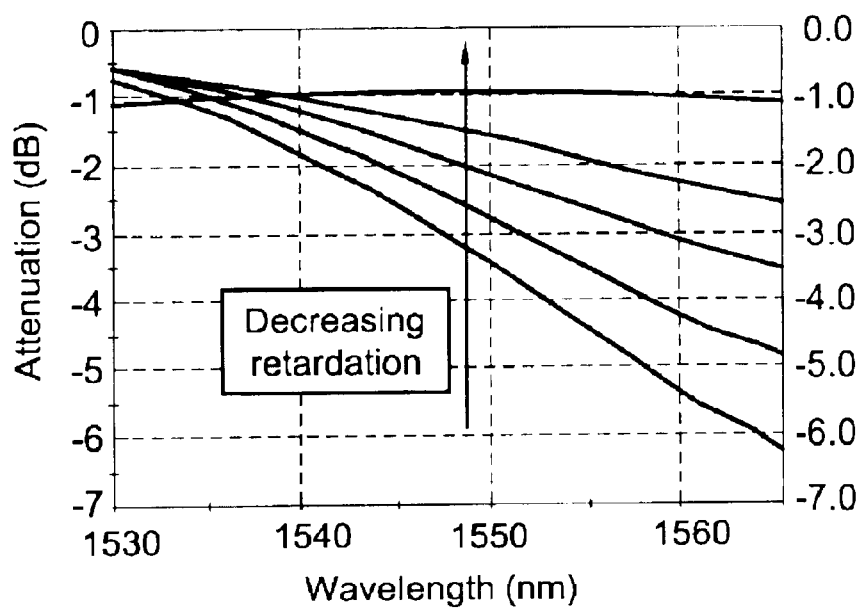
Figure 7B:
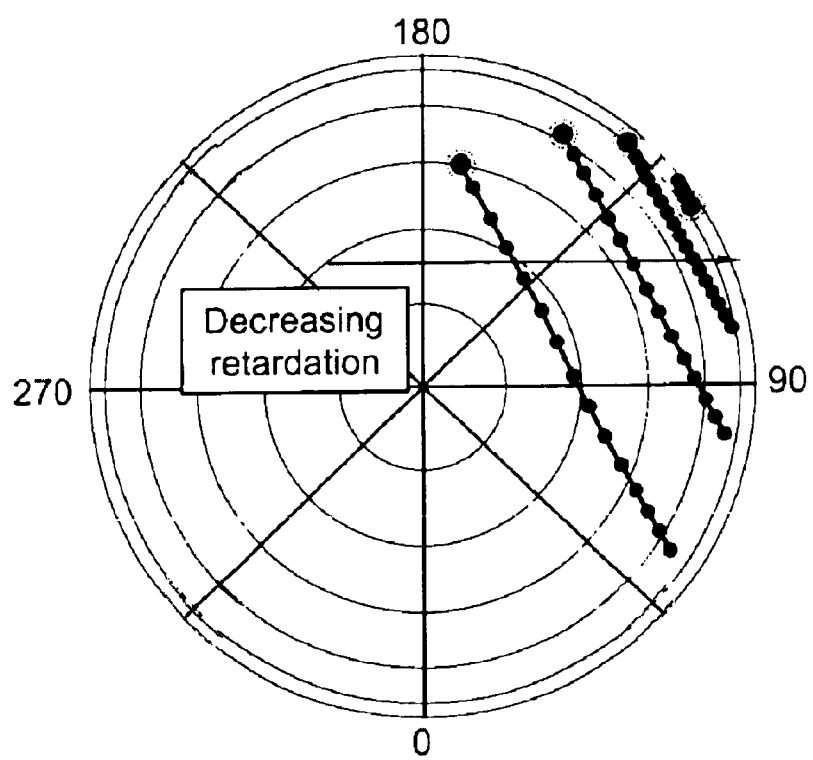
Figure 7C:
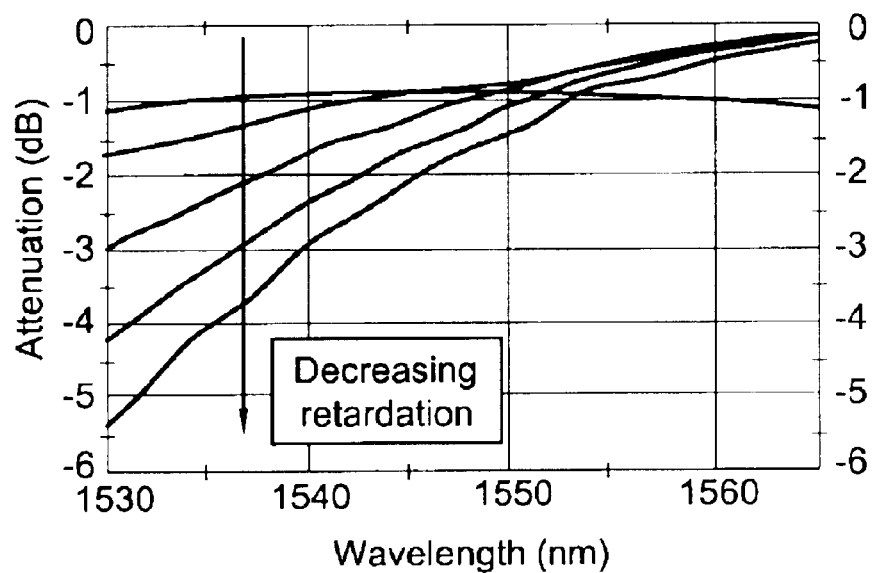
Figure 8:
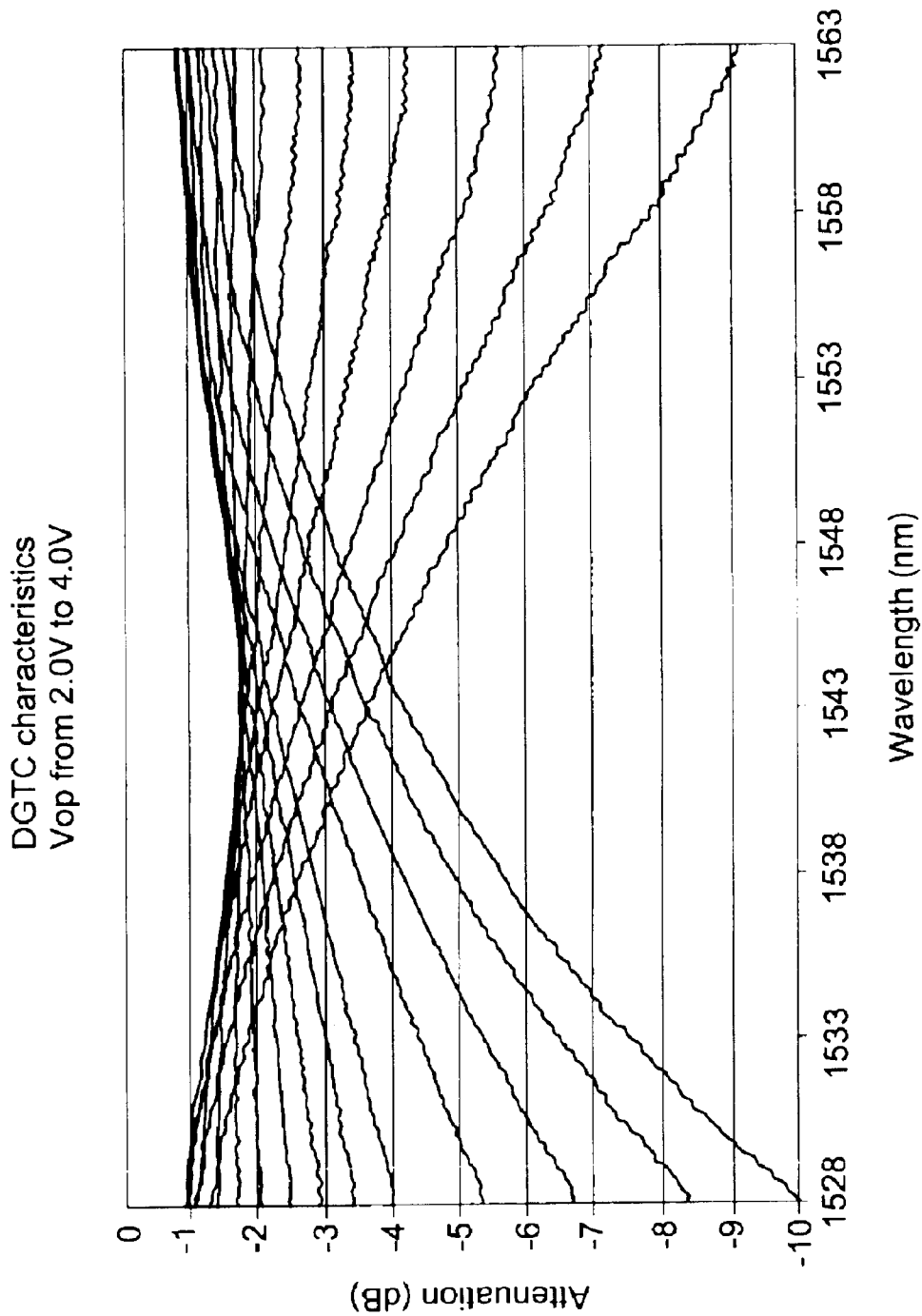

FIG. 8 illustrates the measured results obtained with the embodiment of FIG. 6a. FIG. 8 confirms the variation in slope and curvature. The variable wave plate for the data in FIG. 8 was a 25 micron thick liquid crystal with the RMS value of the applied AC voltage varied from 2.6 to 3.6 volts to achieve a smoothly varying slope from about an average of −0.28 dB/nm to about an average of +0.28 dB/nm over the wavelength range of 1528 to 1563 nm. The curvature generally fits the EDFA output by having a negative curvature for the positive sloping curves and a positive curvature at higher wavelengths for the negatively sloping curves.

Figure 9:
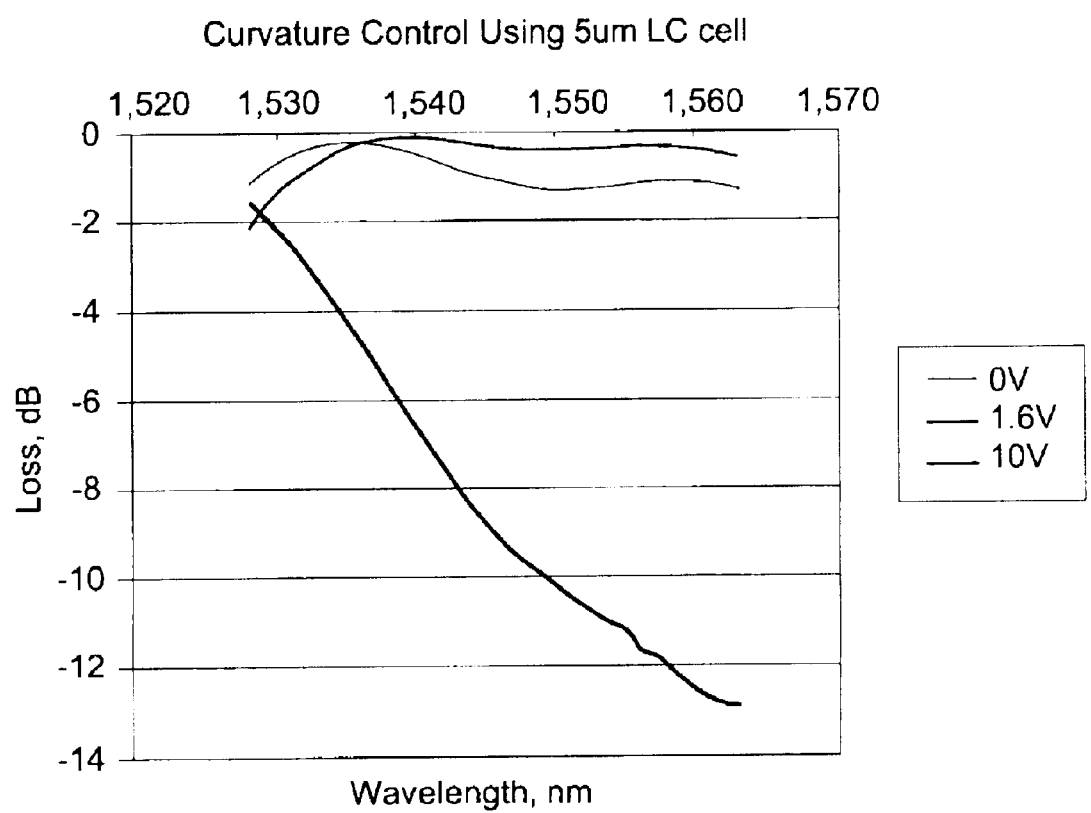
FIG. 9 illustrates simulated results for a design with three wave plates and one variable wave plate.

Additional control over the curvature is achievable with alternative embodiments of the invention. For example, additional wave plates and additional variable wave plates at different orientations can be used. As an example, FIG. 9 shows simulated results using three fixed wave plates with one variable wave plate. The wave plates include: one with 13.29 waves of retardation at 1550 nm oriented at 45 degrees, one with retardation of 6.62 waves at 1550 nm and orientation of −7 degrees, and one with retardation of 25.97 waves at 1550 nm oriented at 30 degrees. The variable wave plate is a 5 micron thick liquid crystal with the optic axis at 30 degrees. The analyzer is oriented at 9 degrees. A range of profiles is demonstrated with these curves, including a distinct change in slope near 1540 nm for both the positive and negative sloping curves. This control of the curvature of the spectral transmittance provides an advantage in compensating the spectral profile of an optical amplifier, such as an EDFA.

Nearly identical performance is achieved for any of the embodiments described above if the incident linear polarization and the analyzer transmitting direction are simultaneously rotated by 90 degrees. This is the basis for a polarization independent gain tilt controller illustrated in FIG. 10a.

Figure 10A:
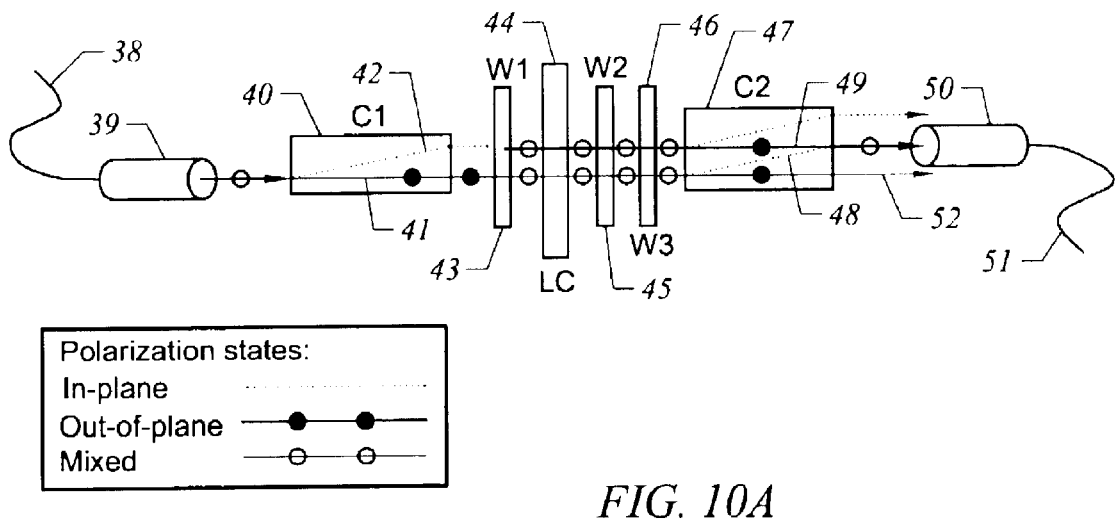
FIG. 10A is a schematic of an embodiment of the current invention for operation in a fiber optic line.
Figure 10B:
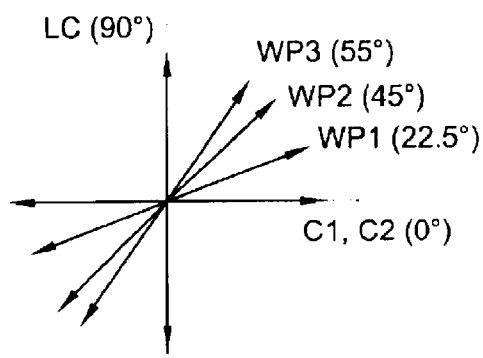
FIG. 10B illustrates wave plate orientations.

FIG. 10a shows an embodiment of the current invention for application in a fiber optic network. This embodiment corresponds to the device configuration of FIG. 6a. The light from a fiber 38 enters the device through a collimating lens 39. It then passes through a birefringent crystal 40 that displaces the ordinary 41 (R1) and extraordinary 42 (R2) components of the light by a small distance at the exit to the crystal. The separation depends on the crystal length, birefringence and optic axis orientation with respect to the propagation direction. The displacement should be sufficient to produce minimal overlap between the two beam spots. After exiting the beam displacer, the light passes normally through a half wave plate 43 (W1). W1 is required to rotate the linear polarization of both rays by 45 degrees. The two rays, R1 and R2, then pass through the variable wave plate 44 (LC) and two fixed wave plates 45 (W1) and 46 (W2) that serve the same functions as WP1 and WP2 described above in conjunction with the embodiment of FIG. 6a. The light then passes through a second polarizer (e.g., a birefringent crystal) 47 (C2) that is identical to C1. The crystal splits rays R1 and R2 into their ordinary and extraordinary components. The extraordinary component of R1 48 and the ordinary component of R2 49 coalesce at the exit surface of C2. The recombined beam is focused by a collimating lens 50 into the output fiber 51. The other two components 52 and 53 of R1 and R2 are not collected by the optics and are lost at the output.

The two collected rays have nominally the same optical path length so that in addition to being polarization independent, the device also is free of polarization mode dispersion, an important consideration for high data rate optical transmission.

Figure 11:
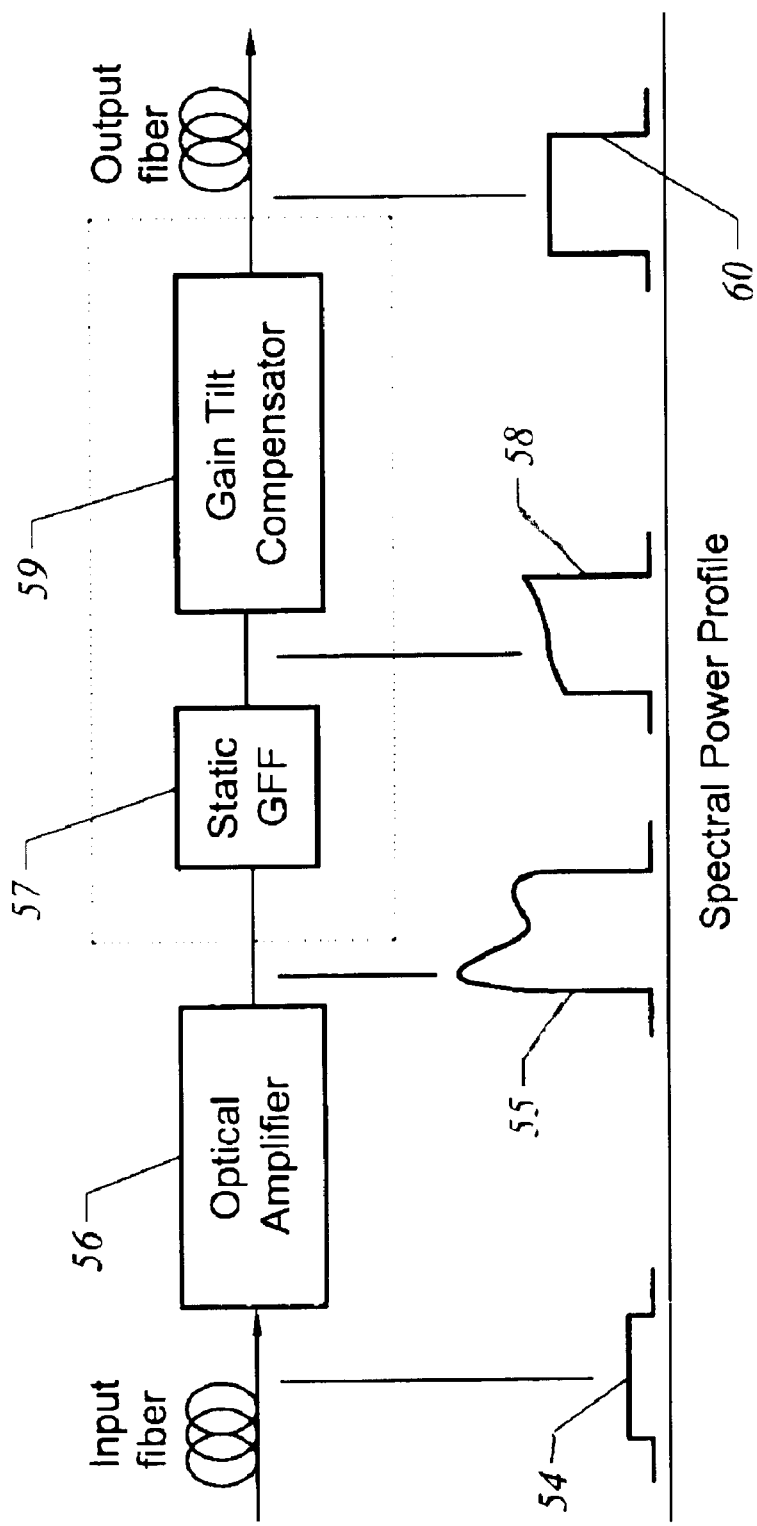
FIG. 11 is a schematic of an embodiment of the current invention for controlling the gain tilt of a fiber amplifier.

FIG. 11 shows an embodiment of the current invention wherein the DGTC is incorporated into a fiber optic amplifier circuit to achieve a flattened gain profile at the output after amplification of a flat input signal 54. The nonlinear signal 55 exiting the amplifier 56 is passed through a static gain flattening filter (GFF) 57. The spectral profile at the output of the GFF 58 is then corrected by passage through the gain tilt controller 59 to achieve a nearly flat spectral profile 60 for the gain at the output.

Unlike a general gain equalizer, the apparatus of the invention does not provide arbitrary gain profile adjustment. Instead, the invention provides a technique for dynamically controlling the optical gain profile for a monotonically varying signal. In contrast to a gain equalizer, the apparatus of the invention is inexpensive, small, has lower insertion loss and power consumption, and is simpler to control because there is only one control variable and very little feedback monitoring.

The invention is particularly useful in processing optical signals with wavelengths between approximately 1525 and 1565 nm, sometimes referred to as the C-band. The invention is also successfully used in connection with the S-band (wavelengths between approximately 1485 and 1520 nm) and the L-band (wavelengths between approximately 1570 and 1615).

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. An apparatus for processing an optical beam, comprising: at least one variable optical element to dynamically alter the polarization state of a polarized optical beam to form a polarization-altered optical beam, wherein said polarization-altered optical beam includes elliptical polarization;

at least one wave plate to process said polarized optical beam, each wave plate having a selected retardation, order of retardation, and orientation; and a polarization analyzer operative in conjunction with said at least one variable optical element and said at least one wave plate to alter the transmitted amplitude of said polarization-altered optical beam as a function of wavelength in accordance with a selected profile, and thereby produce an output optical beam with transmitted amplitude adjusted as a function of wavelength.

2. The apparatus of claim 1 configured to alter said transmitted amplitude of said polarization-altered optical beam in a substantially linear manner on a logarithmic scale.

3. The apparatus of claim 1 wherein said at least one wave plate is positioned before said at least one variable optical element.

4. The apparatus of claim 1 wherein said variable optical element dynamically alters the polarization state of said polarized optical beam so as to smoothly and continuously alter the slope profile of said polarized optical beam between different states selected from a positive slope profile state, a substantially flat profile state, and a negative slope profile state.

5. The apparatus of claim 1 wherein said variable optical element is a liquid crystal.

6. The apparatus of claim 1 wherein said variable optical element is an electro-optic birefringent element.

7. The apparatus of claim 1 wherein said variable optical element is an acousto-optic variable element.

8. The apparatus of claim 1 wherein said variable optical element is a birefringent crystal wedge.

9. The apparatus of claim 1 wherein said wave plate has multiple orders.

10. The apparatus of claim 1 further comprising a set of wave plates of predetermined orders and orientations.

11. The apparatus of claim 1 wherein said wave plate is at an orientation of between approximately 35 and 55 degrees with respect to said polarized optical beam.

12. The apparatus of claim 1 wherein at least one wave plate has an order of retardation greater than one.

13. The apparatus of claim 1 wherein said polarization analyzer is a birefringent crystal.

14. The apparatus of claim 1 configured to process a polarized optical beam with wavelengths between approximately 1525 and 1565 nm.

15. The apparatus of claim 1 configured to process an optical beam with a wavelength of approximately 1540 nm or less.

16. The apparatus of claim 1 configured to process an optical beam with wavelengths between approximately 1485 and 1520 nm.

17. The apparatus of claim 1 configured to process an optical beam with wavelengths between approximately 1570 and 1615 nm.

18. The apparatus of claim 1 configured to process an optical beam with amplitude varying monotonically with wavelength.

19. The apparatus of claim 1 further comprising a polarizer to process an optical beam to produce said polarized optical beam, said polarized optical beam including orthogonally polarized beams.

20. The apparatus of claim 19 wherein said polarizer is a birefringent crystal.

21. The apparatus of claim 19 wherein said polarization analyzer combines said orthogonally polarized beams to produce a recombined beam with an amplitude substantially independent of the polarization of said optical beam.

22. The apparatus of claim 19 wherein said polarization analyzer combines said orthogonally polarized beams to produce a recombined beam with a dispersion substantially independent of the polarization of said optical beam.

23. The apparatus of claim 1 in combination with a fiber optic transmission line.

24. The apparatus of claim 1 in combination with an optical amplifier.

25. A method of processing an optical beam, comprising:
dynamically altering the polarization state of a polarized optical beam to form a polarization-altered optical beam, wherein said polarization-altered optical beam includes elliptical polarization; and
altering the transmitted amplitude of said polarization-altered optical beam as a function of wavelength in accordance with a selected profile, thereby producing an output optical beam with transmitted amplitude adjusted as a function of wavelength.

26. The method of claim 25 further comprising modifying said transmitted amplitude of said polarization-altered optical beam in a substantially linear manner on a logarithmic scale.

27. The method of claim 25 further comprising adjusting said polarization state of said polarized optical beam so as to smoothly and continuously alter the slope profile of said polarized optical beam between different states selected from a positive slope profile state, a substantially flat profile state, and a negative slope profile state.

28. The method of claim 25 utilized to process an optical beam with wavelengths between approximately 1525 and 1565 nm.

29. The method of claim 25, utilized to process an optical beam with wavelengths between approximately 1485 and 1520 nm.

30. The method of claim 25 utilized to process an optical beam with wavelengths between approximately 1570 and 1615 nm.

31. The method of claim 25 utilized to process an optical beam with a wavelength of approximately 1540 nm or less.

32. The method of claim 25 to process an optical beam with amplitude varying monotonically with wavelength.

33. The method of claim 25 further comprising an initial operation of separating an input optical beam into orthogonally polarized beams.

34. The method of claim 33 wherein altering includes producing a recombined beam with an amplitude substantially independent of the polarization of said input optical beam.

35. A method of processing an optical beam, comprising:
dynamically altering the polarization state of a polarized optical beam to form a polarization-altered optical beam, wherein said polarization-altered optical beam includes elliptical polarization; and
altering the transmitted amplitude of said polarization-altered optical beam as a function of wavelength, thereby producing an output optical beam with transmitted amplitude adjusted as a function of wavelength, wherein said optical beam is processed with amplitude varying substantially monotonically with wavelength.

36. The method of claim 35 further comprising modifying said transmitted amplitude of said polarization-altered optical beam in a substantially linear manner on a logarithmic scale.

37. The method of claim 35 further comprising modifying said transmitted amplitude of said polarization-altered optical beam in accordance with a selected profile.

38. The method of claim 35 further comprising adjusting said polarization state of said polarized optical beam so as to smoothly and continuously alter the slope profile of said polarized optical beam between different states selected from a positive slope profile state, a substantially flat profile state, and a negative slope profile state.

39. The method of claim 35 further comprising an initial operation of separating an input optical beam into orthogonally polarized beams.

40. The method of claim 39 wherein altering includes producing a recombined beam with an amplitude substantially independent of the polarization of said input optical beam.

* * * * *